United States Patent
Zhang

(10) Patent No.: US 10,431,163 B2
(45) Date of Patent: Oct. 1, 2019

(54) BACKLIGHT SCANNING METHOD, BACKLIGHT SCANNING DEVICE AND LIQUID CRYSTAL DISPLAY DEVICE

(71) Applicant: BOE Technology Group Co., Ltd., Beijing (CN)

(72) Inventor: Lilei Zhang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 1505 days.

(21) Appl. No.: 13/996,113

(22) PCT Filed: Oct. 16, 2012

(86) PCT No.: PCT/CN2012/083034
§ 371 (c)(1),
(2) Date: Jun. 20, 2013

(87) PCT Pub. No.: WO2014/012303
PCT Pub. Date: Jan. 23, 2014

(65) Prior Publication Data
US 2014/0152536 A1    Jun. 5, 2014

(30) Foreign Application Priority Data
Jul. 17, 2012 (CN) .......................... 2012 1 0247864

(51) Int. Cl.
*G09G 3/34* (2006.01)
*G02F 1/1335* (2006.01)

(52) U.S. Cl.
CPC ..... *G09G 3/3406* (2013.01); *G02F 1/133615* (2013.01); *G09G 3/342* (2013.01);
(Continued)

(58) Field of Classification Search
CPC .................................................. G09G 3/4306
See application file for complete search history.

(56) References Cited

U.S. PATENT DOCUMENTS

2004/0252255 A1* 12/2004 Folkerts ............ G02F 1/133615
349/61
2007/0109254 A1* 5/2007 Kang ..................... G09G 3/342
345/103
(Continued)

FOREIGN PATENT DOCUMENTS

CN    101063773 A    10/2007
CN    101901585 A    12/2010
(Continued)

OTHER PUBLICATIONS

Third Office Action (Chinese language) issued by the State Intellectual Property Office ("SIPO") dated Apr. 20, 2015 for International Application No. 2012102478644, 6 pages.
(Continued)

*Primary Examiner* — Nelson M Rosario
*Assistant Examiner* — Scott Au
(74) *Attorney, Agent, or Firm* — Ladas & Parry LLP

(57) ABSTRACT

There are provided a backlight scanning method and a device thereof. The method comprises: dividing an edge lighting type backlight source into an upper side optical region and a lower side optical region; turning on the light sources at the upper and lower sides respectively after the response of the liquid crystal corresponding to the pixels in the last row of the upper and lower side optical regions is stationary; turning off the light sources at the upper and lower sides respectively when the next response period of the liquid crystal corresponding to the pixels in the first row of the upper and lower side optical regions starts. The method solves the difficulties of applying the scanning backlight to the edge lighting type backlight source by respectively controlling the timings of turning on and off the light sources at the upper and lower sides, whereby the application scope of the scanning backlight is broadened.

12 Claims, 2 Drawing Sheets

(52) U.S. Cl.
CPC ............ *G02F 2001/133601* (2013.01); *G09G 2310/024* (2013.01); *G09G 2310/0218* (2013.01)

(56) References Cited

U.S. PATENT DOCUMENTS

| | | | |
|---|---|---|---|
| 2010/0214331 A1* | 8/2010 | Pyun .................... | G02B 6/0068 345/697 |
| 2011/0090263 A1* | 4/2011 | Kim ................. | G02F 1/133615 345/690 |
| 2011/0141003 A1* | 6/2011 | Kim ....................... | G09G 3/342 345/102 |
| 2011/0157111 A1* | 6/2011 | Lee ...................... | G09G 3/3406 345/205 |
| 2012/0033151 A1* | 2/2012 | Toyotaka .......... | G02F 1/134336 349/43 |
| 2012/0105508 A1* | 5/2012 | Masuda ............ | G02F 1/133615 345/690 |
| 2012/0293717 A1* | 11/2012 | Takata .............. | G02F 1/133615 348/725 |

FOREIGN PATENT DOCUMENTS

| | | |
|---|---|---|
| CN | 102117605 A | 7/2011 |
| CN | 102160386 A | 8/2011 |
| CN | 202057827 U | 11/2011 |
| TW | 200426770 A | 12/2004 |

OTHER PUBLICATIONS

English translation of Third Office Action issued by SIPO for International Application No. dated Apr. 20, 2015, 8 pages.
International Preliminary Report on Patentability for International Application No. PCT/CN2012/053034, Ten (10) pages.
Second Office Action (Chinese language) issued by the State Intellectual Property Office ("SIPO") dated Sep. 30, 2014 for International Application No. 2012102478644, 7 pages.
English translation of second Office Action issued by Sipo for International Application No. 2012102478644, 7 pp.
First Office Action (Chinese Language) dated Jul. 17, 2012 by the State Intellectual Property Office ("SIPO") for application No. CN 2012102478644, 35 pages.
English translation of first Office Action (for application No. CN 2012102478664), listed above, 5 pages.
International Search Report (Chinese language) issued by the International Searching Authority ("ISA") dated Apr. 12, 2014, for PCT/CN2012/083034, 13 pages.
English abstract of CN 202057827U, listed above, 1 page.
English abstract of CN 102117605A, listed above, 2 pages.
English abstract of CN 101063773A, listed above, 1 page.
English abstract of TW 200426770, listed above, 1 page.
English abstract of CN 102160386A, listed above, 1 page.
English abstract of CN 101901585A, listed above, 1 page.

* cited by examiner

BACKLIGHT SCANNING METHOD, BACKLIGHT SCANNING DEVICE AND LIQUID CRYSTAL DISPLAY DEVICE

CROSS REFERENCE TO RELATED APPLICATIONS

This application is based on International Application No. PCT/CN2012/083034 filed on Oct. 16, 2012, which claims priority to Chinese National Application No. 201210247864.4, filed on Jul. 17, 2012, the contents of which are incorporated herein by reference.

TECHNICAL FIELD

The present invention relates to a backlight scanning method, a backlight scanning device and a liquid crystal display device.

BACKGROUND

Backlight scanning technology divides a liquid crystal display into a plurality of areas based plane zones. In any area, the backlight (e.g., LED backlight) is turned on or off at suitable positions of the liquid crystal response curve. When the liquid crystal response curve is in a slowly ascending or descending phase (trailing phase), the backlight is turned off, so when the liquid crystal response curve is in a stationary phase, the backlight is turned on. The scanning backlight technology can improve the definition of a displayed picture, reduce the trailing phenomenon and increase contrast ratio. In order for the backlight source to keep the characteristics of being light and thin while being applied with the scanning backlight technology, an edge lighting type scanning backlight technology becomes a hot research topic.

Since liquid crystal pixel response is performed according to a row-by-row response manner, it is easier to apply the scanning backlight technology to a backlight source module having light bars at left and right sides of the display panel for horizontal control, and it may confront more difficulties to apply the technology to a backlight source module having light bars at upper and lower sides of the display panel for vertical control. But, the backlight source module having light bars at upper and lower sides has prominent advantages of heat dissipation over the backlight source module having light bars at left and right sides. Better heat dissipation can give rise to a longer life of service. Therefore, how to apply scanning backlight technology to the backlight source module having light bars at upper and lower sides has become an urgent issue to be addressed.

SUMMARY

Embodiments of the present invention provide a backlight scanning method, a backlight scanning device and a liquid crystal display device, which can realize scanning backlight based on an edge lighting type backlight source while ensuring the definition of the scanning backlight.

One aspect of the present invention provides a backlight scanning method used for a backlight source, which is an edge lighting type backlight source comprising light sources and a light guiding element, the light sources being disposed on upper and lower sides of the light guiding element, the light guiding element comprising an upper side optical region and a lower side optical region that are parallel to each other, the method comprising:

turning on the light sources at the upper and lower sides respectively after the response of the liquid crystal corresponding to the pixels in the last row of the upper and lower side optical regions is stationary; and turning off the light sources at the upper and lower sides respectively when the next response period of the liquid crystal corresponding to the pixels in the first row of the upper and lower side optical regions starts.

For example, the light guiding element forms the upper side and the lower side optical regions that are parallel to each other by forming a seam in a horizontal position in the middle of the light guiding element.

For example, the two joint surfaces of the light guiding element joining each other at the seam are reflective surfaces.

For example, the response period of the pixel liquid crystal and the refresh frequency of the liquid crystal display are reciprocal to each other.

Another aspect of the present invention provides a backlight scanning device comprising a driving circuit, an edge lighting type backlight source, and a backlight source control circuit, wherein the edge lighting type backlight source comprises an upper side and a lower side optical regions, and an upper side and a lower side light sources corresponding to the upper side and the lower side optical regions respectively; the backlight source control circuit being used for sending control signals to the driving circuit after the response of the liquid crystal corresponding to the pixels in the last row of the optical regions at the upper and lower sides is stationary and when the next response period of the liquid crystal corresponding to the pixels in the first row of the optical regions at the upper and lower sides starts; the driving circuit being used for turning on the light sources at the upper and lower sides according to the control signal that is sent out after the response of the liquid crystal corresponding to the pixels in the last row of the optical regions at the upper and lower sides is stationary, and turning off the light sources at the upper and lower sides according to the control signal that is sent out when the next response period of the liquid crystal corresponding to the pixels in the first row of the optical regions at the upper and lower sides starts.

For example, the edge lighting type backlight source comprises a light guiding element which is provided with a seam in a horizontal position in the middle, the seam dividing the light guiding element into an upper side optical region and a lower side optical region.

For example, the two joint surfaces of the light guiding element joining each other at the seam are reflective surfaces.

For example, the response period of the pixel liquid crystal and the refresh frequency of the liquid crystal display are reciprocal to each other.

For example, the light sources are point light sources or linear light sources.

A further aspect of the present invention provides a liquid crystal display device, which includes the aforesaid backlight scanning device.

The backlight scanning method, the backlight scanning device and the liquid crystal display device in the embodiments of the present invention solve the technical problem that the scanning backlight cannot be applied to the edge lighting type backlight source having light sources at upper and lower sides, i.e., broadening the application scope of the scanning backlight, without affecting the definition of the backlight source.

BRIEF DESCRIPTION OF THE DRAWINGS

In order to clearly illustrate the technical solution of the embodiments of the invention, the drawings of the embodi

REFERENCE SIGNS

11: light bars at the upper and lower sides; 12: LED assembly; 13: upper frame; 14: membrane material; 15: tiled light guiding plate; 16: bottom reflective sheet; 17: backbone panel; 18: seam.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, the technical or scientific terms used in the present disclosure shall have the general meanings understandable for those ordinarily skilled in the field of the present invention. The wordings such as "first", "second" or similar used in the description and claims of the present application shall not represent any order, number or importance, but are used for distinguishing between similar elements. The words such as "one", "a" or similar shall not represent limitation of numbers, but mean existence of at least one. The wordings such as "upper", "lower", "left", "right" and etc. shall be used only to represent relative positions as shown in the figures, wherein, when the absolute position of the described object is changed, the relative positions may be changed accordingly.

In an embodiment of the present invention, an edge lighting type backlight source comprises light sources and a light guiding element; the light sources are disposed on the upper and lower sides of the light guiding element respectively, and the light guiding element comprises an upper side optical region and a lower side optical region. The backlight source is adapted for a liquid crystal display device, and the display area of the liquid crystal panel of the liquid crystal display device includes plural rows of pixels. The backlight scanning method used for the backlight source comprises tuning on the light sources at the upper and lower sides after the response of the liquid crystal corresponding to the pixels in the last row of the optical regions at the upper and lower sides is stationary; and turning off the light sources at the upper and lower sides when the next response period of the liquid crystal corresponding to the pixels in the first row of the optical regions at the upper and lower sides starts.

Figure 1:
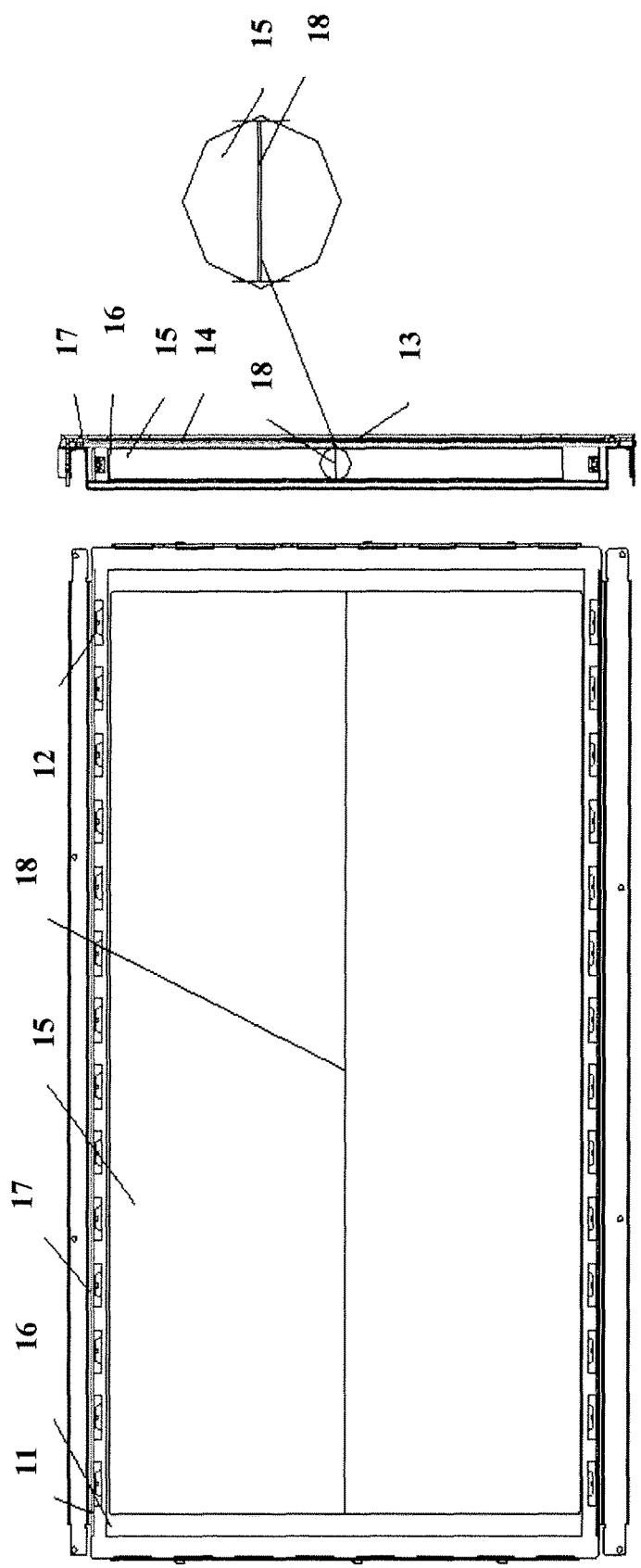
- FIG. 1 is a structural schematic view of the backlight source of edge lighting type in the present invention.

FIG. 1 shows a structure of the edge lighting type backlight source in the embodiment of the present invention. A top view of the backlight source is shown at the left side of FIG. 1, and a longitudinal sectional view of the backlight source at the right side.

The edge lighting type backlight source comprises light bars 11 at upper and lower sides and a plurality of light emitting diode (LED) assemblies 12 disposed on the light bars 11. With reference to the longitudinal sectional view, the backlight source comprises an upper frame 13, a membrane material 14, tiled light guiding plates 15, a bottom reflective sheet 16, and a backbone panel 17, which are sequentially disposed from the upper surface to the lower surface. These LED assemblies 12 as light sources are for example sequentially disposed along a length direction of each light bar 11, opposite to the side surface of one light guiding plates 15. The tiled light guiding plates 15 are joined together at a seam 18 in the horizontal position in the middle thereof. With the seam 18, the light from the LED assemblies at the upper side and that from the lower sides is not mixed with each other. Thus, the edge lighting type backlight source divides the light guiding element (the light guiding plate 15s herein) into an upper side optical region and a lower side optical region by providing the seam 18 in a horizontal position in the middle of the light guiding element. The optical regions of the light guiding element generally correspond to the display area of the liquid crystal panel, and the upper and the lower side optical regions respectively correspond to the upper part and the lower part of the display area of the liquid crystal panel.

The backlight scanning method of the present embodiment is adapted for the aforesaid edge lighting type backlight source and comprises the following steps:

Step 201, turning on the LED assemblies at the upper and lower sides after the response of the liquid crystal corresponding to the pixels in the last row of the optical regions at the upper and lower sides is stationary; and Step 202, turning off the light sources at the upper and lower sides when the next response period of the liquid crystal corresponding to the pixels in the first row of the optical regions at the upper and lower sides starts.

Figure 2:
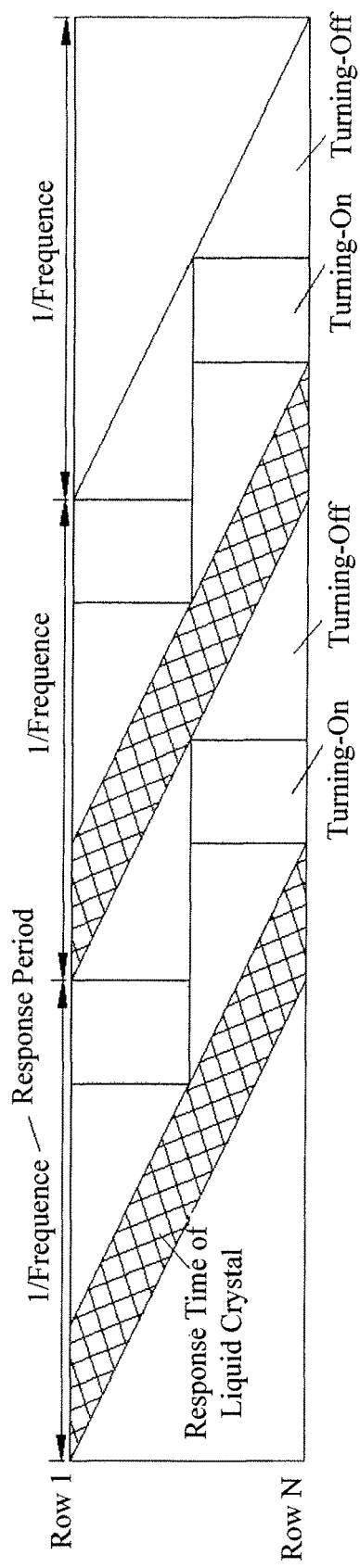
FIG. 2 is a functional diagram showing the backlight scanning method of the present invention.

FIG. 2 shows a functional diagram of the backlight scanning method of the present invention applied to the backlight source of FIG. 1. In FIG. 2, the x-axis represents time, and the y-axis represents rows of pixels, e.g., from row 1 to row N, in the display area of the liquid crystal panel. In addition, the grid in FIG. 2 shows the response time of the pixel liquid crystal, and the shadow portion shows the turning-on time of the LED assemblies. As shown in FIG. 2, the LED assemblies at the upper side light bar are turned on after the response of the liquid crystal corresponding to the pixels in the last row of the upper side optical region is stationary; similarly, the LED assemblies at the lower side light bar are turned on after the response of liquid crystal corresponding to the pixels in the last row of the lower side optical region is stationary.

As shown in FIG. 2, when the next response period of the liquid crystal corresponding to the pixels in the first row of the upper side optical region starts, the shadow portion of the upper side is ended, i.e., the LED assemblies at the upper side light bar are turned off; at the same time, the liquid crystal corresponding to the pixels of the upper side optical region enters a response phase.

When the next response period of the liquid crystal corresponding to the pixels in the first row of the lower side optical region starts, as shown in FIG. 2, the shadow portion of the lower side is ended, i.e., the LED assemblies at the lower side light bar are turned off; at the same time, the liquid crystal corresponding to the pixels of the lower side optical region enters a response phase.

Herein, the response period of the pixel liquid crystal and the refresh frequency of the liquid crystal display are reciprocal to each other.

The response time of liquid crystal reflects the speed at which the pixel points of the liquid crystal display device react to the input signals, i.e., the time necessary for changing the pixel points from darkness to brightness or from brightness to darkness, during which time the liquid crystal molecules are twisted and restored under the effect of applied voltages in the liquid crystal cell, so that the pixel points are varied between darkness and brightness. Therefore, the response time of pixel liquid crystal is usually one of the property parameters of liquid crystal display device. The backlight source control circuit may calculate the time for the response of the liquid crystal corresponding to the pixels at the upper and the lower side optical regions to be stationary, according to the dimensions of the divided regions of the backlight source and the display area of the entire liquid crystal panel.

In the backlight source of another embodiment, the light sources to be used are linear light sources such as cold cathode fluorescent lamps (CCFLs), instead of the point light sources such as LEDs.

In order to realize the above method, another embodiment of the present invention provides a backlight scanning device, comprising a driving circuit, an edge lighting type backlight source, and a backlight source control circuit. The edge lighting type backlight source comprises an upper side optical region and a lower side optical region, and the light sources are disposed on the upper side and the lower side of the light guiding element. The backlight source control circuit is adapted for sending control signals to the driving circuit after the response of the liquid crystal corresponding to the pixels in the last row of the upper and lower side optical regions is stationary and when the next response period of the liquid crystal corresponding to the pixels in the first row of the upper and lower side optical regions starts. The driving circuit is adapted for turning on or off the LED assemblies at the upper and lower sides according to the received control signals.

For example, the driving circuit turns on the LED assemblies at the upper and lower sides respectively according to the received control signal that is sent out after the response of the liquid crystal corresponding to the pixels in the last row of the upper and lower side optical regions is stationary, and turns off the LED assemblies at the upper and lower sides respectively according to the received control signal that is sent out when the next response period of the liquid crystal corresponding to the pixels in the first row of the upper and lower side optical regions starts.

To be more specific, when the liquid crystal of pixels at the upper side starts responding, a sequence controller of the liquid crystal display device employing the backlight scanning device sends a clock signal to the backlight source control circuit. After receiving the clock signal, the backlight source control circuit calculates the time needed for the response of all the liquid crystals of the pixels at the upper side to be stationary, and then sends a control signal to the driving circuit after the period of the needed time has elapsed, whereby the driving circuit controls to turn on the LED assemblies at the upper side light bar. When the liquid crystal of the pixels at the upper side starts to respond again, the sequence controller of the backlight source sends a clock signal again to the backlight source control circuit. The backlight source control circuit sends a control signal to the driving circuit when it judges that the difference between the received clock signal and the last clock signal is one response period, whereby the driving circuit controls to turn off the LED assemblies at the upper side light bar. The LED assemblies at the lower side light bar can be turned on and off in a similar process to the above, and no more details are given herein.

Similarly, in the backlight scanning device of another embodiment, the light sources to be used are linear light sources such as cold cathode fluorescent lamps (CCFLs), instead of the point light sources such as LEDs.

Herein, the edge lighting type backlight source is divided into an upper side optical region and a lower side optical region with the seam disposed in a horizontal position in the middle of the light guiding element. For example, the two joint surfaces at the seam may be reflective surfaces so as to better prevent light from mixing with each other. Beside planar surfaces, the joint surfaces may also be curved surfaces, as long as the two joint surfaces at the seam are bonded to each other tightly.

Herein, the response period of the pixel liquid crystal and the refresh frequency of the liquid crystal display are reciprocal to each other.

A further embodiment of the present invention provides a liquid crystal display device, which comprises a liquid crystal panel and an aforesaid backlight scanning device. The backlight scanning device is disposed behind the liquid crystal panel for providing a light source for the liquid crystal panel. In addition, the optical regions of the light guiding element in the backlight scanning device corresponding to the display area of the liquid crystal panel.

The above embodiments of the present invention are given by way of illustration only and thus are not limitative of the protection scope of the present invention, which is determined by the attached claims.

The invention claimed is:

1. A backlight scanning method used for a backlight source in a liquid crystal display, the backlight source being an edge lighting type backlight source and comprising light sources and a light guiding element, the light sources being disposed at an upper side of the light guiding element and a lower side of the light guiding element, and the light guiding element comprising an upper side optical region and a lower side optical region that are parallel to each other, and the light guiding element further comprising a reflective surface which is provided between the upper side optical region and the lower side optical region, and is configured for preventing light from the upper side optical region from mixing with light from the lower side optical region, the method comprising:
   turning on the light sources at the upper side of the light guiding element and the light sources at the lower side of the light guiding element respectively after twisting of liquid crystal corresponding to pixels in the upper side optical region and twisting of liquid crystal corresponding to pixels in the lower side optical region are respectively stopped; and
   turning off the light sources at the upper side of the light guiding element and the light sources at the lower side of the light guiding element respectively when twisting of the liquid crystal corresponding to the pixels in the first rows of the upper side optical region and the lower side optical region respectively start.

2. The method according to claim 1, wherein a response period of the liquid crystal for the pixels and a refresh frequency of the liquid crystal display are reciprocal to each other.

3. The method according to claim 1, wherein a response period of the liquid crystal for the pixels and a refresh frequency of the liquid crystal display are reciprocal to each other.

4. The method according to claim 1, wherein the light sources at the upper side of the light guiding element is turned on only in a time period that response of liquid crystal corresponding to all pixels of the upper side optical region is stationary and next response periods of the liquid crystal corresponding to pixels in a first row of the upper side optical region start; the light sources at the lower side of the light guiding element is turned on only in a time period that response of liquid crystal corresponding to all pixels of the lower side optical region is stationary and next response periods of the liquid crystal corresponding to pixels in a first row of the lower side optical region start.

5. A backlight scanning device for a liquid crystal display, comprising a driving circuit, an edge lighting type backlight source, and a backlight source control circuit, wherein the edge lighting type backlight source comprises an upper side optical region and a lower side optical region, and an upper side light source and a lower side light source corresponding to the upper side optical region and the lower side optical region respectively, and the edge lighting type backlight source further comprises a reflective surface which is provided between the upper side optical region and the lower side optical region, and is configured for preventing light from the upper side optical region from mixing with light from the lower side optical region;

the backlight source control circuit is adapted for sending control signals to the driving circuit after response of liquid crystal corresponding to pixels in last rows of the upper side optical region and the lower side optical region is stationary and when next response periods of liquid crystal corresponding to pixels in first rows of the upper side optical region and the lower side optical region; and the driving circuit is adapted for turning on the upper side light source and the lower side light source according to the control signals that are sent out twisting of liquid crystal corresponding to pixels in the upper side optical region and twisting of liquid crystal corresponding to pixels in the lower side optical region are respectively stopped, and turning off the upper side light source and the lower side light source according to the control signals that are sent out when twisting of the liquid crystal corresponding to the pixels in the first rows of the upper side optical region and the lower side optical region respectively start.

6. The backlight scanning device according to claim 5, wherein a response period of the liquid crystal for the pixels and a refresh frequency of the liquid crystal display are reciprocal to each other.

7. The backlight scanning device according to claim 5, wherein the light sources are point light sources or linear light sources.

8. A liquid crystal display device, comprising the backlight scanning device according to claim 5.

9. The backlight scanning device according to claim 5, wherein a response period of the liquid crystal for the pixels and a refresh frequency of the liquid crystal display are reciprocal to each other.

10. The backlight scanning device according to claim 5, wherein the light sources are point light sources or linear light sources.

11. A backlight scanning method used for a backlight source in a liquid crystal display, the backlight source being an edge lighting type backlight source and comprising light sources and a light guiding element, the light sources comprises first light sources and second light sources respectively provided at a first side and a second side, which are opposite to each other, of the light guiding element, and the light guiding element comprising a first optical region and a second optical region which are parallel to each other, the first optical region and the second optical region are respectively corresponding to the first side and the second side of the light guiding element, and the light guiding element further comprising a reflective surface which is provided between the first optical region and the second optical region, and is configured for preventing light from the first optical region from mixing with light from the second optical region, the method comprising:

turning on the first light sources after response of the liquid crystal corresponding to pixels in a last row of the first optical region is stationary, and at a later time, turning on the second light sources after response of the liquid crystal corresponding to pixels in a last row of the second optical region is stationary; and turning off the first light sources when a next response period of the liquid crystal corresponding to pixels in a first row of the first optical region starts, and at a later time, turning off the second light sources when a next response period of the liquid crystal corresponding to pixels in a first row of the second optical region starts, wherein a time period for turning on the first light sources and a time period for turning on the second light sources are not overlapped with each other.

12. A backlight scanning device applied with the backlight scanning method according to claim 11, comprising a driving circuit, the backlight source, and a backlight source control circuit, wherein the backlight source control circuit is configured for sending a first turn-on signal to the driving circuit after the response of the liquid crystal corresponding to the pixels in the last row of the first optical region is stationary, and at a later time, sending a second turn-on signal to the driving circuit after the response of the liquid crystal corresponding to the pixels in the last row of the second optical region is stationary;

the backlight source control circuit is further configured for sending a first turn-off signal to the driving circuit when the next response period of the liquid crystal corresponding to the pixels in the first row of the first optical regions starts, and at a later time, sending a second turn-off signal to the driving circuit when the next response period of the liquid crystal corresponding to the pixels in the first row of the second optical regions starts;

the driving circuit is configured for turning on the first light sources according to the first turn-on signal that is sent out, and at a later time, turning on the second light sources according to the second turn-on signal that is sent out; and the driving circuit is further configured for turning off the first light sources according to the first turn-off signal that is sent out, and at a later time, turning off the second light sources according to the second turn-off signal that is sent out.

* * * * *